Dec. 24, 1963     L. WEISSER     3,114,998
TREE CROP HARVESTER
Filed Nov. 16, 1961     4 Sheets-Sheet 1

Lee Weisser
INVENTOR

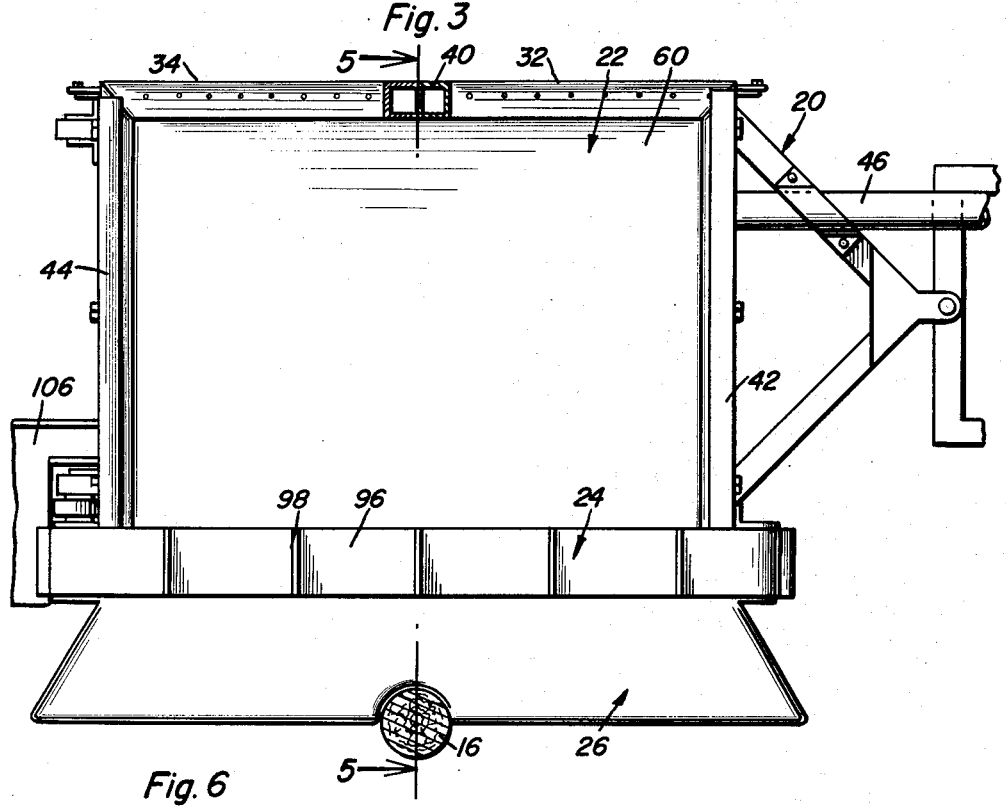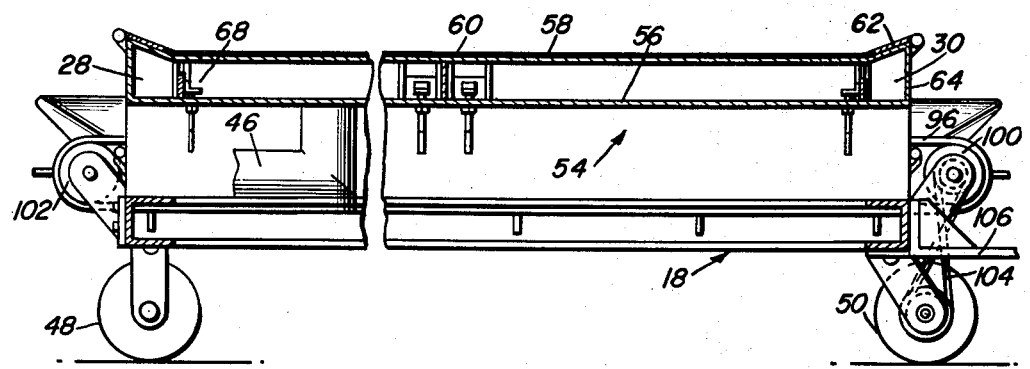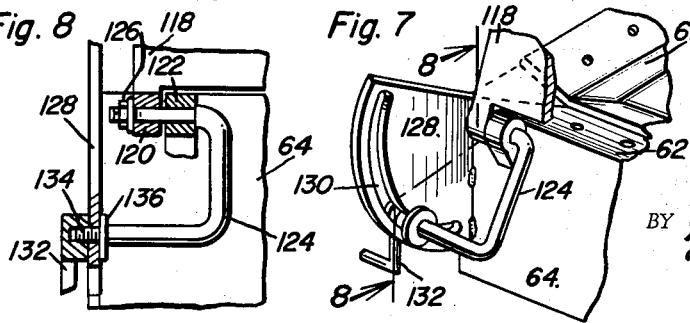

Lee Weisser
INVENTOR.

Dec. 24, 1963 L. WEISSER 3,114,998
TREE CROP HARVESTER
Filed Nov. 16, 1961 4 Sheets-Sheet 4

Lee Weisser
INVENTOR.

BY
Attorneys

United States Patent Office 3,114,998
Patented Dec. 24, 1963

3,114,998
TREE CROP HARVESTER
Lee Weisser, Delta, Colo.
(750 E. Powell, Gresham, Oreg.)
Filed Nov. 16, 1961, Ser. No. 152,858
10 Claims. (Cl. 56—329)

This invention relates to a new and useful harvesting machine for tree grown fruits and nuts.

The present invention relates to harvesting apparatus for use in tree orchards that represents a complete departure from tree crop harvesters heretofore used. The harvester apparatus of the present invention employs directed streams of air at high velocities for shaking the crop loose from the branches of a tree and diverting the falling crop onto collecting surfaces that cushion the fall and permit the crop to accumulate on a conveyor for delivery to a collecting bin or the like. The tree crop is thereby harvested in a more reliable manner with less likelihood of damage to the tree or the crop and with less loss of crop.

It is therefore a primary object of the present invention to provide a tree crop harvester that utilizes high velocity airstreams for vibrating and agitating the branches of a tree for crop picking purposes.

Another object of this invention is to provide a tree crop harvester in accordance with the foregoing object that includes an air cushioned collector surface and inflated flexible abutment flap for engagement with the tree trunk in response to the flow of air.

A further object of this invention is to provide a tree crop harvester wherein the high velocity airstreams discharged for crop picking purposes, also divert and guide the falling crop onto the collector surface for more complete and efficient accumulation of the crop.

An additional object of this invention is to provide apparatus for harvesting a tree crop which will inherently clean the crop as it is being collected by virtue of the use of high velocity airstreams for picking and diverting the falling crop.

A still further object of this invention is to provide a tree crop harvester utilizing high velocity airstreams for picking and diverting the crop which may also be utilized as a carrier for insecticides, fungicides and other dusts that may thereby be simultaneously applied to the crop as it is being harvested.

Other objects of this invention include the provision of a tree crop harvester which utilizes a novel method for picking and collecting the crop that enables the harvester to be more widely adjusted for the varying requirements of different trees and crop ripeness, by control over the airflow velocity, the volumetric flow rate of the air and the speed of the vehicle mounting the harvester.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is an enlarged top plan view of the harvester unit illustrated in FIGURE 1.

FIGURE 6 is an enlarged broken sectional view taken substantially through a plane indicated by section line 6—6 in FIGURE 2.

FIGURE 7 is an enlarged partial perspective view of the flow deflecting mechanism associated with the harvester unit of the present invention.

FIGURE 8 is a partial sectional view taken substantially through a plane indicated by section line 8—8 in FIGURE 7.

Figure 1:
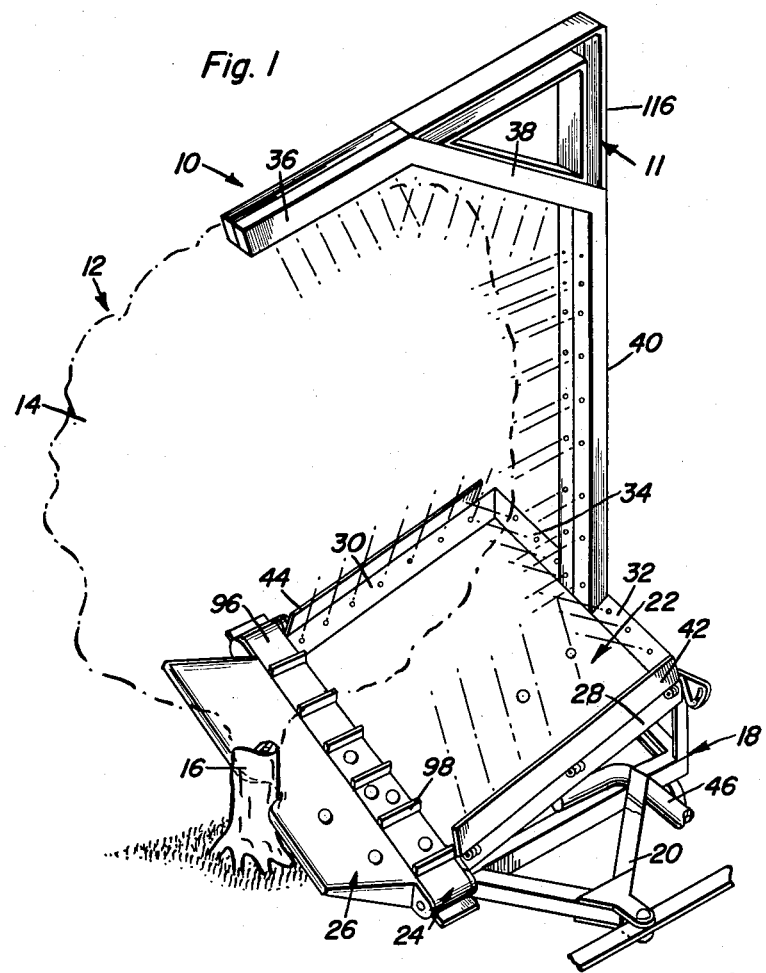
FIGURE 1 is a perspective view of a tree crop harvester unit made in accordance with the present invention.
Figure 2:
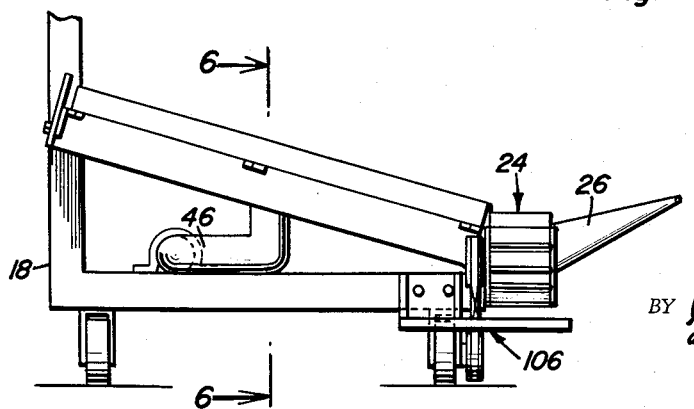
FIGURE 2 is an enlarged partial rear elevational view of the harvester unit illustrated in FIGURE 1.
Figure 11:
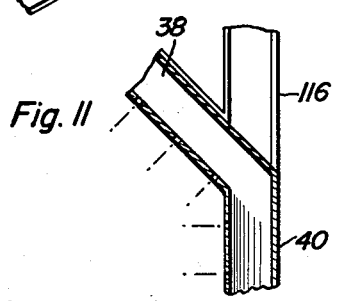
FIGURE 11 is a fragmentary elevational view of the portion of FIGURE 1 generally indicated by the arrow 11.

Referring now to the drawings in detail, attention is initially invited toward FIGURE 1 wherein a single tree crop harvester unit is illustrated and is generally referred to by reference numeral 10. It will be observed that the harvester unit 10 is disposed in operative relation to a tree 12 which includes the crop bearing branch portion 14 and the trunk portion 16. The harvester is therefore supported in spaced relation above the ground by means of a supporting frame assembly generally referred to by reference numeral 18 that may be connected in any suitable manner to a towing vehicle through a hitch 20. The harvester is thereby moved forwardly in a direction parallel to a row of trees within an orchard. The frame 18 therefore mounts a crop collector generally referred to by reference numeral 22 which is disposed in inclined relation downwardly in a direction toward the tree trunk for the purpose of permitting the crop collected thereon to roll downwardly onto a crop delivery conveyor generally referred to by reference numeral 24 that is mounted on the frame 18 at the lower edge portion of the collector 22. Also mounted by the frame assembly 18 on the other side of the delivery conveyor 24 opposite the collector 22, is an inflatable tree trunk abutment assembly generally referred to by reference numeral 26. The collector 22 and the abutment assembly 26 are therefore arranged to guide the crop falling thereon onto the conveyor 24 for movement of the crop in a direction opposite to the forward direction of movement of the harvester. The frame assembly 18 also mounts fluid or airflow directing means from which airstreams are discharged at high velocities and directed against the fruit bearing branch portion 14 of the tree 12 for shaking the fruit or crop loose therefrom. The airstreams also are effective to divert the falling crop for insuring collection thereof on the collector 22. The air discharging assemblies include therefore, lower upward flow directing picking sections including the forward upward flow directing section 28 and the rear upward flow directing section 30 which are interconnected by the forward upward flow directing side picking section 32 and the rear side upward flow directing picking section 34. The lower sections 28, 30, 32 and 34 are mounted by the frame assembly 18 in peripheral relation to the collector 22 so that the airstreams being therefrom will in addition to shaking the lower tree branches of the tree, also divert the falling crop onto the collector 22. The airflow discharging assembly further includes interconnected downward flow directing top picking sections 36 and 38 which are disposed a substantial distance above the collector 22 and supported on the frame assembly 18 by means of a crop diverting lateral flow directing discharge section 40 that extends vertically above the collector 22. It will be observed therefore, that each of the fluid flow directing discharging sections from which the high velocity airstreams are emitted include surfaces that are generally directed toward the fruit bearing branch portion of the tree, said surfaces constituting one wall of an airflow duct and being provided with a plurality of spaced apertures through which the airstreams are discharged. The forward and rear sections 28 and 30 are also provided with air deflectors 42 and 44 the purposes of which are explained hereafter. An air supply duct 46 is also mounted by the frame assembly 18 through which air under pressure is supplied to the flow discharging sections and also to the collector 22 and inflatable abutment assembly 26 as will hereafter be described. The air supply duct 46 may therefore be connected to any suitable source of air under pressure that may for example be mounted on the towing vehicle or to a supply source that may be mounted on the harvester frame itself. The source of air under pressure may either be in the form of a compressed air tank or powered air compressor equipment or air emanating from a high velocity and volume fan or the like.

Figure 5:
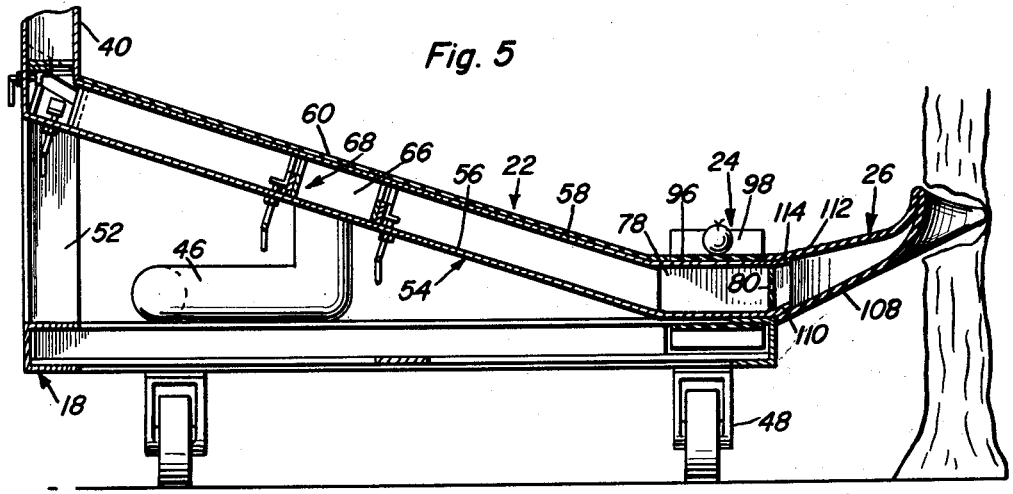
FIGURE 5 is an enlarged sectional view taken substantially through a plane indicated by section line 5—5 in FIGURE 3.

Referring now to FIGURES 2, 3, 5 and 6, it will be observed that the frame assembly 18 may be of any suitable type which is supported in spaced relation above the ground by a plurality of wheel assemblies including a pair of forward wheel assemblies 48 and rear wheel assemblies 50. The frame assembly is therefore provided with suitable supporting frame members 52 such as seen in FIGURE 5, for supporting the collector 22 in its inclined position.

Figure 4:
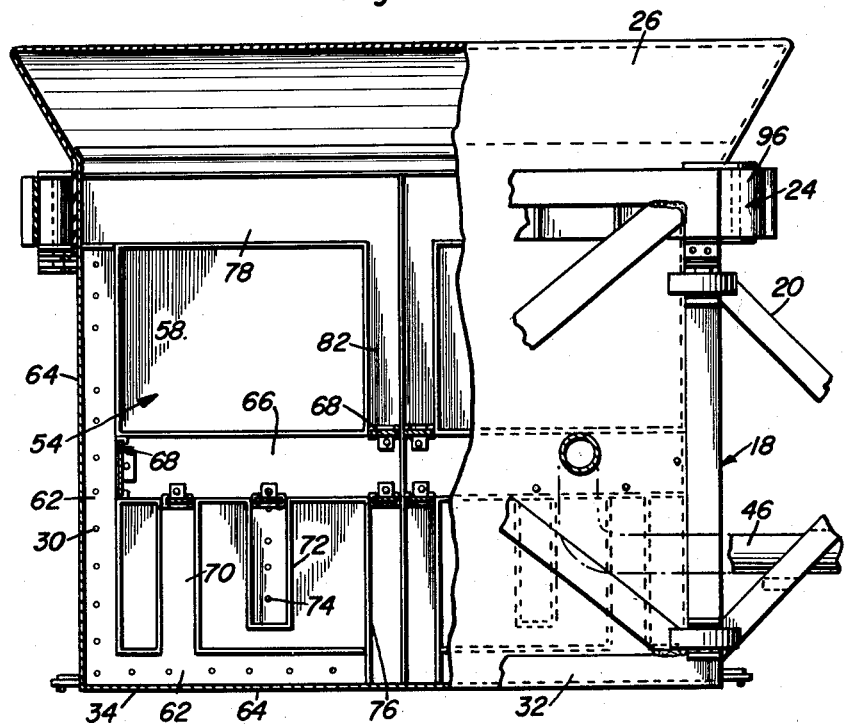
FIGURE 4 is a bottom plan view of the harvester unit with parts broken away and shown in section.

The collector 22 is partially constituted by a rigid tank member generally referred to by reference numeral 54 having a bottom wall 56 and a top wall 58 over which flexible and expandible canvas material 60 is placed and anchored at the peripheral edges to the top wall 58. The canvas material 60 therefore constitutes a cushioning surface for receiving the crop. The peripherally arranged flow discharging ducts 28, 30, 32 and 34 are formed integrally with the tank member 54 to form fluid flow discharging ducts enclosed by the bottom wall 56 of the tank 54, a top wall 62 which is inclined downwardly toward the top wall 58 of the collector 22 and an end wall 64. Each of the flow discharging duct sections is also in communication with a main supply duct 66 as shown in FIGURE 4 which is disposed longitudinally of the tank 54 between the forward and rear ducts 28 and 30 for supplying to said ducts, air under pressure. The air supply to the ducts 28 and 30 is however controlled by an adjustable gate mechanism generally referred to by reference numeral 68 which is disposed between both longitudinal ends of the main supply duct 66 and the flow discharging ducts 28 and 30. Similar adjustable gate mechanisms are disposed between the main supply duct 66 and connecting ducts 70 which provide fluid communication between the flow discharging ducts 32 and 34 and the main supply duct 66. Adjustable gate mechanisms are also provided between the main supply duct 66 and ducts 72 having a plurality of apertures 74 therein which permit the escape of air through the top wall 56 of the tank 54. The air is however confined beneath the canvas material 60 which will expand slightly when air under pressure is supplied to the ducts 72 so as to provide a cushion reception for the crop falling on the material 60. Ducts 76 are also provided for providing fluid communication between the main supply duct 66 and the ducts of flow discharging section 40. Adjustable gate mechanisms are also provided therefor between the main supply duct 66 and the connecting ducts 76. The supply duct 46 is therefore connected adjacent one end to the main supply duct 66 as more clearly seen in FIGURE 6. It will also be observed from FIGURE 5, that the lower longitudinal side of the tank 54 is connected to a horizontally disposed passage portion 78 having a plurality of spaced openings 80 through which air is supplied to the inflatable abutment assembly 26. The passage 78 as more clearly seen in FIGURE 4 is supplied with air from the main supply duct 66 through the connecting passage 82 and an adjustable gate mechanism 68.

Figure 9:
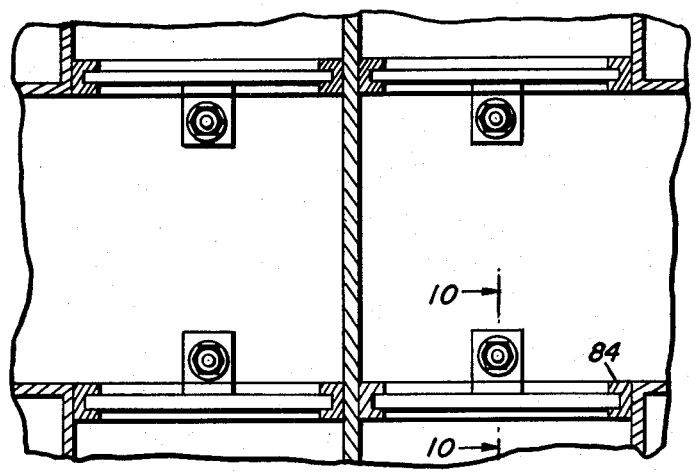
FIGURE 9 is an enlarged partial section view of a broken away section portion of FIGURE 4.
Figure 10:
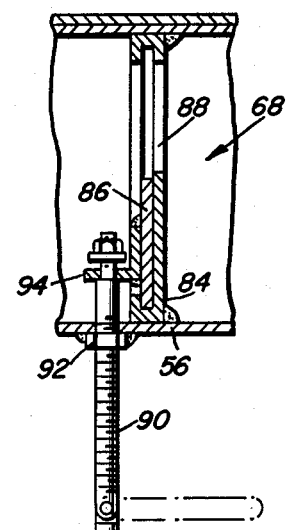
FIGURE 10 is a partial sectional view taken substantially through a plane indicated by section line 10—10 in FIGURE 9.

Referring now to FIGURES 9 and 10 in particular, a typical adjustable gate mechanism 68 is illustrated which gate mechanisms adjustably control the flow of air from the main supply duct 66 to the flow discharging ducts, to the passage 78 for inflation of the tree trunk abutting assembly 26 and by the connecting ducts 72 for cushioned inflation of the material 60 of the collector 22. It will be observed therefore, that where the ducts intersect with the main supply duct 66, a track forming structure 84 is welded or otherwise suitably connected to the walls of the duct for slidably receiving the flow gate member 86. An opening 88 is provided by the track frame member 84 which may be controllably reduced in dimension by the gate member 86 upon adjustable movement thereof by means of an manually adjustable screw member 90 having a pivotal handle element 91 attached thereto. Said screw member 90 is threadedly received by a nut member 92 welded to the bottom wall 56 of the tank 54 and connected to a connecting flange member 94 welded or otherwise secured to the slidable gate member 86. The airflow to each of the flow discharging sections and the inflatable collector 22 and abutment assembly 26 may thereby be regulated.

It will be observed that the delivery conveyor 24 is disposed about the horizontally positioned passage portion 78 through which air is conducted to the inflatable abutment assembly 26. The conveyor 24 is thereby disposed at the lower longitudinal side of the collector 22 and includes an endless conveyor belt 96 to which a plurality of spaced cleat members 98 may be connected for movement of the crop rearwardly of the harvester. The belt member 96 is therefore entrained about a pair of belt pulleys 100 and 102 rotatably mounted by the frame assembly 18 adjacent the forward and rear ends thereof. The conveyor belt 96 may therefore be driven in the proper direction by any suitable mechanism as for example the cross belt drive 104 which drivingly interconnects the rear wheel assembly 50 to the belt pulley 100 as more clearly seen in FIGURE 6. The frame assembly 18 may therefore also mount a supporting bracket 106 that underlies the rear discharge end of the conveyor belt. A collecting bin may therefore be supported on the bracket 106 for receiving the crop at the rear discharge end of the delivery conveyor 24.

When air is flowing through the main supply duct 66, the air will flow through the passage 78 and be discharged through the openings 80 therein into the abutment assembly 26. The abutment assembly therefore includes a lower relatively stiff canvas material 108 secured to a projecting portion 110 of the tank member 54 while the upper portion of the abutment assembly includes a relatively lighter canvas material 112 secured to the projecting portion 114 on the tank member 54. The canvas members 108 and 112 therefore form an inflatable flap which when inflated will yieldably abut the tree trunk 16 as more clearly seen in FIGURE 3, to prevent the loss of crop between the tree trunk and the delivery conveyor 24. The inflatable flap 26 is therefore also disposed at an inclined angle downwardly toward the delivery conveyor 24.

It will be observed that air supplied to the vertical duct 40 will be discharged in a substantially horizontal direction while the top sections 36 and 38 discharge the air generally downwardly on top of the tree branches. It will therefore be obvious that the vertical duct section 40 may be made extensible for accommodating trees of different heights. The top section 36 may therefore also be extensible in a lateral direction for accommodating trees of different branch depth. Further, the section 38 may be pivotally connected to the vertical section 40 for adjustable angular support by the bracing section 116, for further dimensional adjustment purposes.

It will also be apparent that the airstreams discharged from the rear and forward sections 30 and 28 of the flow discharging sections, may be directionally varied or controlled by means of the deflector mechanisms 42 and 44. Referring therefore to FIGURES 7 and 8 in particular, it will be observed that each of the deflector mechanisms includes a flow deflecting vane member 118 that is hingedly mounted adjacent the opposite ends thereof. Adjacent one end of the deflecting members 118, there is provided a hinge projection 120 axially alined with a hinge member 122 fixed to the flow discharging section wall 64 with a hinge pin portion 122 extending therethrough. The hinge pin portion 122 is however made integral with an arm member 124 by means of which the angular position of the deflector member 118 may be set inasmuch as the hinge projection 120 of the deflector member is rigidly connected to the hinge pin portion 122 through the fastener 126. Accordingly, a sector plate 128 is fixed to the wall 64 of the flow discharging section and is provided with an arcuate slot 130 within which the arm 124 may be moved for angular adjustment of the deflector member 118 connected thereto. The arm 124 may therefore be locked in any angular position within the slot 130 by means of a lock member 132 threadedly engaged with a threaded end 134 of the arm member 124 which has a thrust washer 136 fixed thereto in abutting relation to the sector plate 128.

Figure 13:
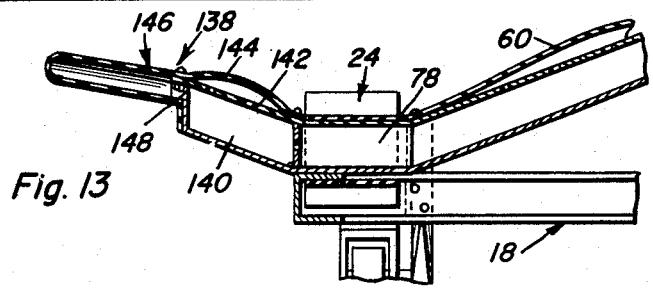
FIGURE 13 is a partial sectional view showing a modified form of tree crop harvester unit.

FIGURE 13 illustrates a modified form of harvester unit in which the abutment assembly differs from that described with respect to the harvester unit 10. It will be observed therefore, that the abutment assembly 138 in FIGURE 13, includes a downwardly inclined rigid passage portion 140 which communicates with the horizontal passage portion 78 as described with respect to the harvester unit 10. The inclined section 140 includes opening 142 therein by means of which the canvas material 144 may be expanded for cushioned reception of crop received from the tree and also from the flap portion 146. The flap portion 146 is therefore made of canvas material which is upwardly displaced for tree trunk engagement when air is directed thereinto through the opening 148.

Figure 12:
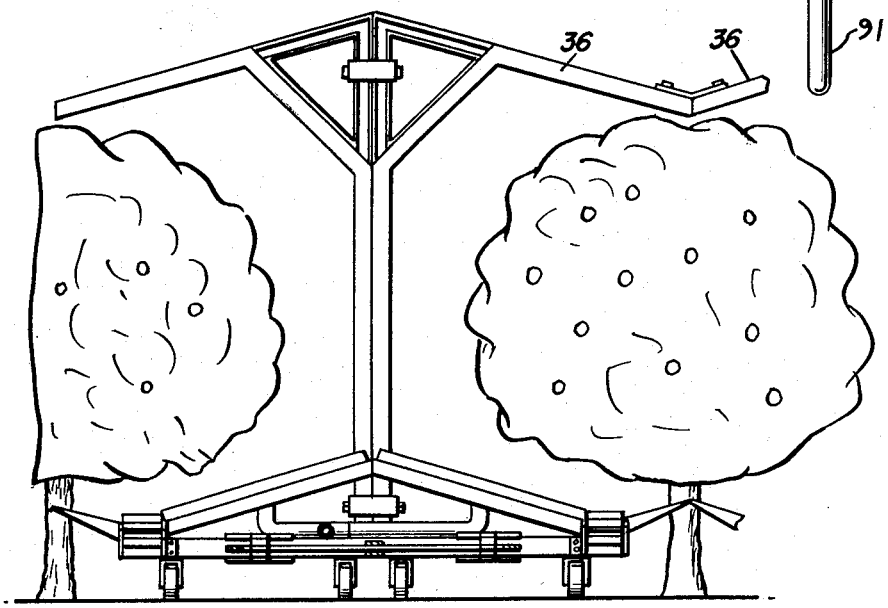
FIGURE 12 is a partial front elevational view of a plurality of tree crop harvesters ganged together.

Referring now to FIGURE 12, it will be observed that a plurality of harvester units may be interconnected for simultaneous movement both between adjacent rows of trees and on opposite sides of a row of trees in order to completely cover the trees being harvested and also to harvest two rows of trees at the same time. It will be appreciated therefore, that adjacent harvester units are of similar construction but are mirror images of each other for disposition in proper relation to the trees. Also, adjacent harvester units disposed between the rows of trees may be bolted to each other by means of the frame assemblies and the vertical portions thereof. The adjacent harvester units on opposite sides of a tree on the other hand, may be coupled to each other by means of the top flow discharging sections 36.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A tree crop harvester comprising, crop collecting means including a fluid cushioned surface means, fluid flow directing means fluidly coupled to the collecting means and cushioned surface for directing discharge of fluid at high velocities for picking and diverting a tree-mounted crop onto said collecting means and cushioned surface by agitating and shaking loose said crop on said tree and crop delivery means for automatically removing said harvested crop from said collecting means and cushioned surface, said fluid flow directing means including upward flow directing sections mounted peripherally on said collecting means and around said cushioned surface for picking and diverting crop, downward flow directing sections for picking crop and lateral flow directing sections fluidly coupling the downward flow directing sections to the upward flow directing sections for diverting falling crop.

2. The combination of claim 1, wherein said collecting means comprises fluid flow conducting means supplying fluid to said flow directing means, and said fluid cushioning surface means being operatively connected to said conducting means for cushioning crop falling thereon in response to flow of fluid to the flow directing means.

3. The combination of claim 2, including inflatable abutment means operatively mounted on said collecting means for tree trunk engagement and operatively connected to said flow directing means for inflation thereof in response to flow of fluid to the flow directing means.

4. The combination of claim 3 wherein said crop delivery means is movably mounted between the abutment means and cushioning surface means for receiivng crop therefrom for conveyance to a collecting bin.

5. The combination of claim 4, wherein said abutment means includes displaceable flap means and expandible surface directing means mounting said flap means in spaced relation to the collecting means and conducting fluid thereto.

6. A tree crop harvester comprising, crop collecting means including a fluid cushioned surface means, fluid flow directing means fluidly coupled to the collecting means and cushioned surface for directing discharge of fluid at high velocities for picking and diverting a tree-mounted crop onto said collecting means and cushioned surface by agitating and shaking loose said crop on said tree and crop delivery means for automatically removing said harvested crop from said collecting means and cushioned surface, said collecting means comprising fluid flow conducting means supplying fluid to said flow directing means, and said fluid cushioning surface means operatively connected to said conducting means for cushioning crop falling thereon in response to flow of fluid to the flow directing means, inflatable abutment means operatively mounted on said collecting means for tree trunk engagement and operatively connected to said flow directing means for inflation thereof in response to flow of fluid to the flow directing means, said crop delivery means being movably mounted between the abutment means and cushioning surface means for reeciving crop therefrom for conveyance to a collecting bin.

7. A tree crop harvester comprising, crop collecting means including a fluid cushioned surface means, fluid flow directing means fluidly coupled to the collecting means and cushioned surface for directing discharge of fluid at high velocities for picking and diverting a tree-mounted crop onto said collecting means and cushioned surface by agitating and shaking loose said crop on said tree and crop delivery means for automatically removing said harvested crop from said collecting means and cushioned surface, inflatable abutment means operatively mounted on said collecting means for tree trunk engagement and operatively connected to said flow directing means for inflation thereof in response to flow of fluid to the flow directing means, said abutment means including displaceable flap means and expandible surface directing means mounting said flap means in spaced relation to the collecting means and conducting fluid thereto.

8. A tree crop harvester comprising, a fluid cushioned crop collecting means and fluid flow directing means fluidly coupled to the collecting means for directing discharge fluid at high velocities for agitating and shaking loose and thus picking and diverting a tree-mounted crop onto said collecting means, said collecting means comprising fluid flow conducting means supplying fluid to said flow directing means, and said fluid cushioned crop collecting means including a cushioned surface means fluidly coupled to said conducting means for cushioning crop falling thereon in response to flow of fluid to the flow directing means, adjustable gate means operatively mounted in the conducting means for selectively controlling flow of fluid to the flow directing means, and flow deflecting means adjustably mounted on the flow directing means for directionally varying discharge of fluid from the flow directing means.

9. A tree crop harvester unit comprising, vehicle frame means, fluid cushioning collector means mounted in inclined relation on the frame means, yieldable fluid actuated abutment means mounted on the frame means in spaced relation to the collector means for abutting one side of a tree trunk, lower crop fluid picking and directing means mounted on the frame means in peripheral relation to the collector means for directing fluid upwardly towards a tree being harvested, upper crop fluid picking and directing means mounted on the frame means and extending upwardly therefrom a substantial distance above the collector means for directing fluid downwardly and laterally towards a tree being harvested, and fluid flow conducting means for conducting fluid to the picking and directing means for discharge therefrom at high velocities and to the collector and abutment means for cushioning inflation thereof.

10. A plurality of tree crop harvester units as defined in claim 9 interconnected for simultaneous movement between adjacent rows of trees and on opposite sides of a row of trees.

References Cited in the file of this patent
UNITED STATES PATENTS

| | | |
|---|---|---|
| 2,590,400 | Gollnick | Mar. 25, 1952 |
| 2,649,680 | Brown | Aug. 25, 1953 |
| 2,996,868 | Voelker | Aug. 22, 1961 |

FOREIGN PATENTS

| | | |
|---|---|---|
| 704,012 | France | Mar. 9, 1931 |
| 1,176,286 | France | Apr. 8, 1959 |